United States Patent [19]
Ebina

[11] Patent Number: 5,849,225
[45] Date of Patent: Dec. 15, 1998

[54] DISC BASE MOLDING METHOD AND APPARATUS THEREFOR

[75] Inventor: Toshiyuki Ebina, Ohbu, Japan

[73] Assignee: Kabushiki Kaisha Meiki Seisakusho, Aichi-ken, Japan

[21] Appl. No.: 613,661

[22] Filed: Mar. 11, 1996

[30] Foreign Application Priority Data

Nov. 1, 1995 [JP] Japan ................................. 7-308454

[51] Int. Cl.$^6$ ................................................. B29C 45/77
[52] U.S. Cl. ........................ 264/40.5; 425/149; 425/150
[58] Field of Search ..................... 425/149, 150; 264/2.2, 40.5

[56] References Cited

U.S. PATENT DOCUMENTS

| | | | |
|---|---|---|---|
| 5,002,706 | 3/1991 | Yamashita | 264/2.2 |
| 5,251,146 | 10/1993 | Neko et al. | 425/149 |
| 5,370,518 | 12/1994 | Sasaki et al. | 425/150 |
| 5,536,159 | 7/1996 | Yamamura et al. | 425/150 |
| 5,552,094 | 9/1996 | Kudota | 264/2.2 |
| 5,609,801 | 3/1997 | Arai | 425/150 |

FOREIGN PATENT DOCUMENTS

B2-2-19774  5/1990  Japan.

*Primary Examiner*—Tim Heitbrink
*Attorney, Agent, or Firm*—Oliff & Berridge, PLC

[57] ABSTRACT

A disc base molding method and apparatus are provided for the injection molding of disc bases so as to produce thin disc bases having increased signal transfer clarity with a shortened molding cycle. Upon closure of a mold, a signal is sent to a mold clamping start delay timer and an injection start delay timer. Pressure is increased for mold clamping at approximately the same time that molten resin is introduced into the mold cavity. The time period from the start of pressure increase when the molten resin is initially introduced to the mold cavity until a specific mold clamping force is reached, is controllable. Upon completion of the injection of the molten resin, the mold clamping force is maintained until the molten resin is solidified.

13 Claims, 4 Drawing Sheets

JITTER Value (ns)

| Timing | In | Out | Distortion Amount (mm) |
| --- | --- | --- | --- |
| (a) | 5.06 | 5.72 | 0.242 |
| (b) | 3.40 | 3.68 | 0.042 |
| (c) | 4.11 | 4.95 | 0.183 |

DISC BASE MOLDING METHOD AND APPARATUS THEREFOR

BACKGROUND OF THE INVENTION

1. Field of the Invention

The present invention relates to a method of manufacture of a disc base and the apparatus therefor, particularly a method of manufacturing a disc base for an audio disc such as a video disc and a compact disc, and an optical recording medium disc and an apparatus therefor.

2. Description of the Prior Art

In general, a disc base, as shown in FIG. 1, is molded by injecting a molten resin in a cavity 3 being formed by closing a fixed mold 1 and a movable mold 2. In the cavity 3, a stamper 4 is disposed, and on the surface 4a of the stamper there are formed the helical or concentric pits which are transferred on the disc base, which is formed with the resin injected and filled in the cavity.

The mounting of the stamper in the cavity 3 is, usually, fastened on either one (in the embodiment of FIG. 1, on the movable mold 2) of the fixed mold 1 or the movable mold 2 with stamper holder rings 5, 6. The inside face of the stamper holder ring 6, which controls the outer circumference of the stamper 4 is formed oblique at a given angle α and spaced at a given distance between the mirror surface 7 of the fixed mold 1, which forms a gas exhaust outlet 8 in order to expel the gas in the cavity 3. In thus constituted the fixed mold 1 and the movable mold 2 are mounted on a fixed plate and on a movable plate respectively, those are operated in the manner of closing, clamping and opening.

In the disc base molding method which conventionally has been carried out in general, in order to prevent a mold from opening due to the pressure of the molten resin injected and filled with, as shown in FIG. 2, after finishing the closing of the molds (timing a of FIG. 2), the increase of pressure for clamping the molds is started (timing b of FIG. 2), it is increased to a given pressure and finished the increase (timing c of FIG. 2), then started to inject the resin (timing d of FIG. 2). And, the molten resin is injected in the cavity 3 with the pressure over the clamping pressure, at that time the molds are a little opened to expel the gas through the gas outlet.

The disc thus molded is required for recording clear signals to have a low birefringence but no difference between the outer and inner circumferential portions of the disc, that is, to have a homogeneous birefringence so that it may have no internal distortion to enjoy a homogeneous surface finish.

And, the dimension standard of the disc base, for instance, in the case of single disc, the thickness thereof is determined as 1.2 mm, and in the case where bonded disc, as two 0.6 mm discs are adhered, it is required to increase a mechanical characteristic such as avoiding distortion.

Further, recently, in order to record more and more information, it is trended to make the pitch and truck of the pits highly compacted, and the transferring property of the stamper is required to be increased.

However, in the case of the molding of the disc base, the cavity is thin and the projected area is large, so that the molding conditions are severe, particularly, in the case of molding the disc having 0.6 mm in thickness, as the cavity is quite narrow, the difference of quality is large and the yield itself is bad.

Therefore, conventionally, in the case of molding the disc base, the pressure of the molten resin to be injected in the cavity is increased, and due to the increase of the temperature of the mold itself and the molten resin, the fluidity of the resin is increased for the improvement of injection.

Further, as known in the disclosure of Japanese Patent Publication No. Hei 2-19774, the method of injection molding of a disc base is known and characterized in that, at the primary pressure where a mold opening force a little larger than the mold clamping force operates on the movable mold, when the resin material is injected into the cavity, the injection pressure is changed from the primary pressure to the secondary pressure where the mold opening force becomes smaller than the mold clamping force and the mold clamping force fills the cavity with the molten resin, and along this filling process, the gas in the cavity is expelled from the gap between the inside of the stamper holding member and the wall surface standing from the step portion of the fixed mold side.

However, in the case of the conventional method of molding a disc base shown as in the FIG. 2, the cavity is narrow, particularly in the case of molding a 0.6 mm thickness of bonded disc base, the injected molten resin is apt to be instantly solidified. A slight opening of the molds like this by the pressure of injection filling pressure of the molten resin in order to expel the air in the cavity in the state where the resin is going to be solidified, signals to be transferred from the stamper are apt to be displaced, and the internal distortion in the disc is generated to deteriorate the mechanical property of the disc base. In addition, in the conventional method shown in FIG. 2, it wastes the time until the start to increase the pressure for the mold clamping force because of valve changing, further the time wastes until the given height of the mold clamping force is attained. So that, the cycle of molding becomes long.

Further, in the above conventional technique, since a high injection pressure is used for injection, which exceeds the mold clamping force, the pressure distribution of the molten resin becomes uneven, and around the circumference of the molded disc base, the stripes due to the pressure are generated, so that there arises a problem that a partial difference of the quality of the disc base in such a manner as the birefringence between the inner side and the outer side of the disc is differently generated.

Further, in the case that, by increasing the temperatures of the mold and the molten resin, the injection is carried out by the increase of the fluidity of the resin, the temperature of the mold becomes close to the temperature of the thermal deformation of the resin (over 120° C. in polycarbonate resin), the disc base generates a mechanical distortion and, which generates an issue to need a long cooling time. And even in this case the birefringence of the finished molded base is to be restricted within the range of 60–80 nm by the double pass, and in addition the mechanical property such as the tilt (the minute bending in the laser inlet and the refractive portion of the base) exceeds the standard greatly.

In the stepwise variation of the mold clamping force, it is necessary to control it precisely and there is a problem of difficulty that the arrangement of the balance between the primary pressure for injection as mold opening force and the secondary pressure, and the mold clamping force happens to be difficult.

SUMMARY OF THE INVENTION

The present invention is made in the light of the above problem, even when the particularly thin disc base is molded for the use of bonded disc base consisting 0.6 mm, the signals can be transferred clearly, and the object thereof is to provide the method for molding of a disc base which shows no internal distortion and the improvement of the mechanical property, and for time-saving of molding cycle, and the apparatus therefor.

Further, the present invention is made in the light of the above problem for providing the method of molding a disc base, in which the quality of the disc base can be molded partially homogeneously by suppressing the filling pressure for injection in the cavity, and making the pressure distribution of the molten resin even, and the apparatus therefor. And further, the present invention is made in the light of the above problem for providing the method of molding a disc base, in which the distortion of the disc base can be prevented by avoiding the necessity of keeping the temperature of the mold and resin high, and can try to shorten the cooling time, and the apparatus therefor.

Still further, the present invention is made in the light of the above problem for providing the method of molding a disc base, in which the disc base improved in the mechanical property merely by keeping the mold clamping force constant without varying the clamping force stepwise, and the apparatus therefor.

In order to attain the above object, the first method of molding the disc base according to the present invention is characterised in that, in the molding method of a disc base in which the molten resin is injected and filled in the cavity of the closed mold, after detecting the finishing the closing the mold, the injection of the molten resin starts approximately at the same time of the start of the increasing the pressure of the mold clamping.

In order to attain the above object, the second method of molding the disc base according to the present invention is characterized in that, in the first invention, the time between the start of the pressure increase of the clamping the mold and its finishing is controllable.

Further, in order to attain the above object, the molding apparatus of the disc base according to the present invention is characterised in that, in said apparatus comprising an injection apparatus which injects and fills with the molten resin in the cavity formed in the mold when closing the molds, the mold clamping apparatus which opens and closes the molds and the control apparatus to control the injection apparatus and the molds clamping apparatus, a detector to detect the finishing of the molds clamping process, and the injection start delay timer which initiates to inject the molten resin in the cavity approximately at the same time when starting to increase the pressure for mold clamping after detecting the finish of the mold closing.

In this invention, when the detector detecting the finishing to close the molds in such a manner as both molds come close by the high speed type of closing means, the injection start delay timer starts to count. The injection start delay timer counts the timing when it becomes possible to substantially increase the pressure to clamp the molds and begins to inject the molten resin in the cavity approximately at the same time. From the increase of the pressure of the molds clamping to the finishing of the pressure increase, the time period is controlled to the given time period after the finishing of the increase of the pressure, and the mold clamping force is kept constant until the molten resin is solidified.

DETAILED DESCRIPTION OF THE INVENTION

Figure 3:
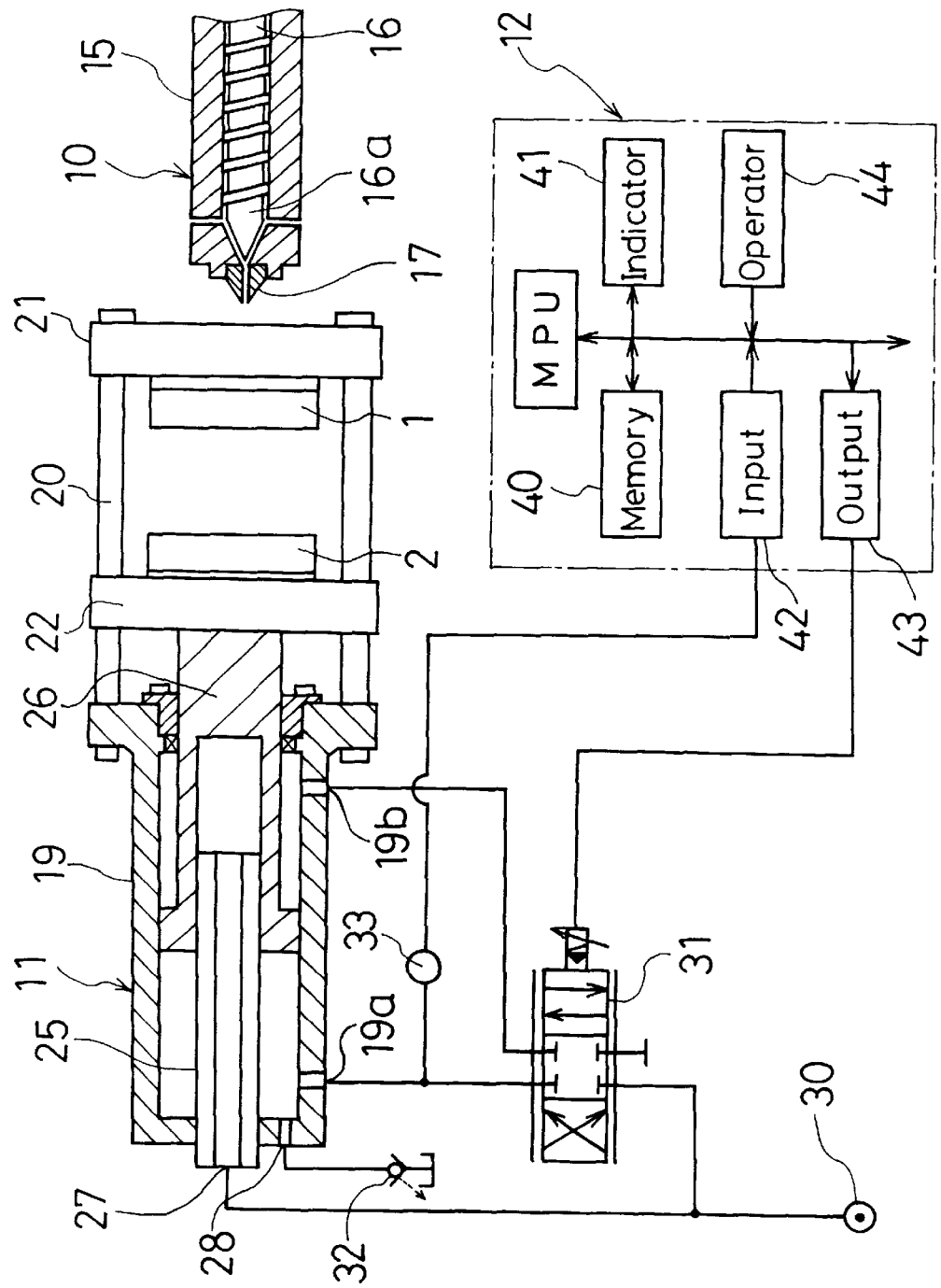
FIG. 3 is a schematic view showing an embodiment of the apparatus for molding the disc according to the present invention.

First, one embodiment of the molding apparatus of a disc base according to the present invention is explained based on FIG. 3. In figures the same reference numerals show the same or corresponding members.

The molding apparatus of a disc base comprises an injection apparatus 10 which will inject and fill with a molten resin in a cavity formed with a fixed mold 1 and a movable mold 2, and a molds clamping apparatus 11 for carrying out the processes of molds closing, molds clamping and molds opening of the fixed mold 1 and the movable mold 2, and a control apparatus 12 to control the injection apparatus 10 and the the molds clamping apparatus 11.

The injection apparatus 10 is formed with a screw 16 within a heating cylinder 15 in such a manner as it can move in rotation direction and forward and backward. And, by the rotation of the screw 16 the molten resin is mixed up, and while heating and melting, a given volume of resin is supplied to the tip end portion 16a of the screw and by forwarding the screw 16, the molten resin is injected and filled in the cavity by the given amount and pressure through the nozzle 17 which is abutted against the face of the sprue bush 9 of the fixed mold.

In the mold clamping apparatus 11, a mold clamping cylinder 19 is disposed opposite to a fixed plate, between the fixed plate 21 and the mold clamping cylinder 19 a tie bar 20 is provided and on the tie bar 20 is mounted with a movable plate 22. The fixed mold 1 and the movable mold 2 are mounted on the the fixed plate 21 and the movable plate 22 respectively. The mold clamping cylinder 19, in this embodiment, is explained as having with booster ram 25, the present invention is not restricted to this kind but also can include an apparatus comprising a single cylinder and ram and a side cylinder type, or a pressure increasing type. In the cylinder 19, a mold clamping ram 26 connected to the movable plate 22 is disposed slidably, the booster ram 25 is inserted with its one end inserted into the center bore of the mold clamping ram 26 and the opposite end projected from the rear end of the mold clamping cylinder 19. And, besides the pressure supplied into a cylinder chamber to drive the mold clamping ram 26 of the mold clamping cylinder 19, and by pressing the mold clamping ram 26 by supplying the hydraulic pressure from the port 27 of the rear end of the booster ram 25, the movable plate 22 is so constructed as to function as closing molds at high speed.

In the mold clamping apparatus 11, a means to detect (not shown) that the mold is closed is provided, which comprises such as a measure to detect the position of the movable plate 22, i.e. the close state of the movable mold to the fixed mold (the mold closing state), an encoder, a potentiometer and a limit switch.

In order to drive the thus constituted mold clamping apparatus, the port 27 of the booster ram 25 is connected by a conduit connected to a hydraulic source 30. And, to a conduit from the hydraulic source 30 and to a conduit connecting the port 19a and 19b of the mold clamping cylinder 19 a servo valve 31 is disposed, the rear side port 28 of the mold clamping ram 26 in the mold clamping cylinder 19 is connected to the tank through a check valve 32. On a conduit between the port 19a of the mold clamping cylinder 19 and the servo valve 31, a pressure detector 33 is provided.

A control apparatus 12 comprises a micro processor unit MPU, a memory 40, an indicator 41, an output 43 and an operator 44.

The memory 40 comprises a ROM which storages the sequence programme etc, a RAM which storages temporarily the molding conditions such as injection pressure, velocity, time, mold clamping pressure determined value. And, in this RAM, as one of the molding conditions, an injection start delay timer, which makes injection of the molten resin to begin after a given time period after detecting the finishing of the mold closing, is stored. And, in the RAM likewise, a pressure increase start delay timer, which makes increase of the pressure to begin after a given time period after detecting the finishing of the mold closing, is stored. The injection start delay timer counts the time in which the start of the pressure increase of the mold clamping substantially becomes possible after finishing the mold closing, approximately at the same time when the pressure increase of the the mold clamping starts, the injection of the molten resin in the cavity begins. The determined values of the pressure increase delay timer and the injection start delay timer are proper to these molding apparatus, and the injection of the molten resin in the cavity and the timing of the pressure increase of the mold clamping are determined once, those are not usually changed but those are stored in RAM as the condition of molding.

The indicator 41 comprises a CRT, a liquid crystal and a plasma etc. for indicating the molding conditions and the measured values at the time of molding.

The input 42 is for receiving the signals from pressure detector 33 and a means for detecting mold closing and these signals are transmitted to the microprocessor unit MPU. The microprocessor unit MPU receives the signal from the input, carries out the operation treatment and the sequence treatment based on the molding conditions and the sequence programme etc., and puts out such signals to the output 43 as to drive for changing the servo valve 31 to begin the pressure increase of mold clamping at a given timing and to advance the screw 16 of the injection apparatus 10 by the injection start delay timer in order to inject and fill at a given timing the molten resin in the cavity 3 of the mold.

The microprocessor unit MPU operates a closing loop based on the determined values of the mold clamping pressure and the signal transmitted from the pressure detector 33 through the input 42 and feed-back controls the mold clamping force until it goes stable in a given level from the start of the mold clamping in such a manner as it becomes a given variation volume to the time.

The operator 44 is for receiving the input of the molding conditions including the determined value of the mold clamping force and the determined values of the mold clamping delay timer and the injection start delay timer and the hand operated signals of the molding apparatus, and comprises a key board, a push-button switch and a selector switch etc.

Figure 1:
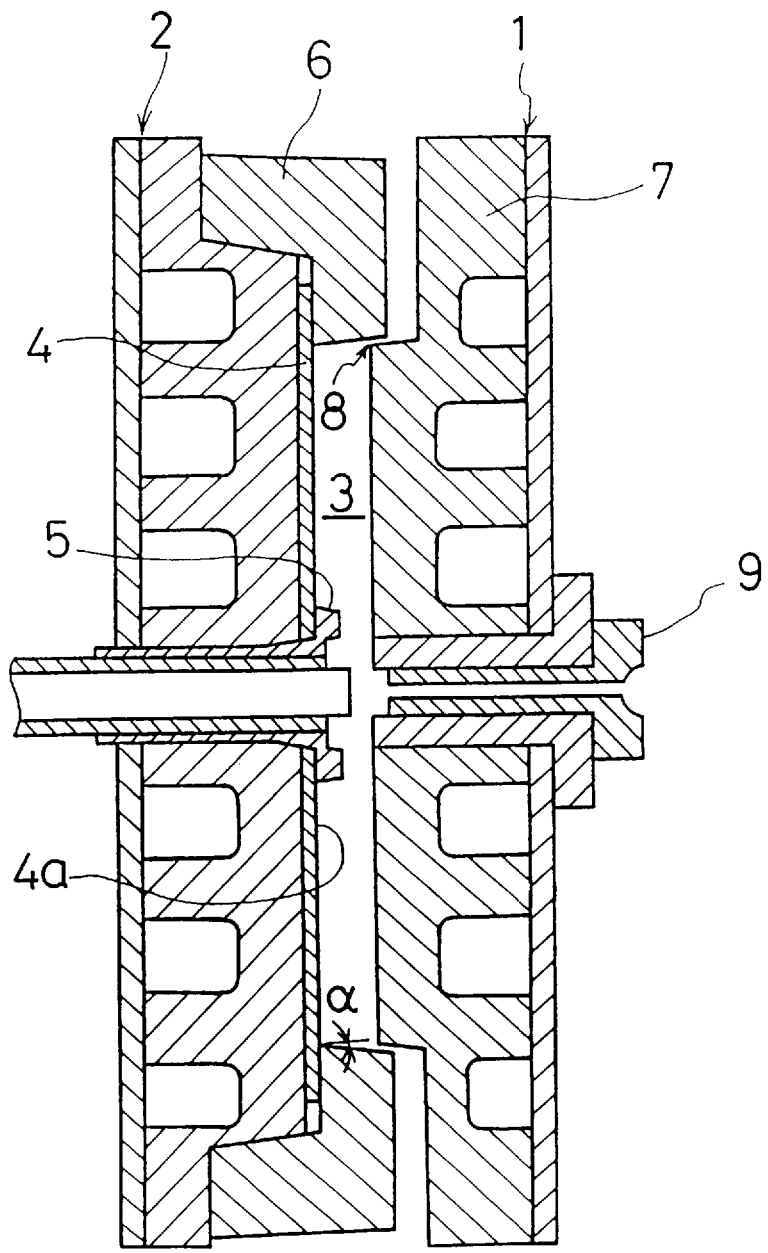
FIG. 1 is a sectional view of molds for molding a disc base.
Figure 2:
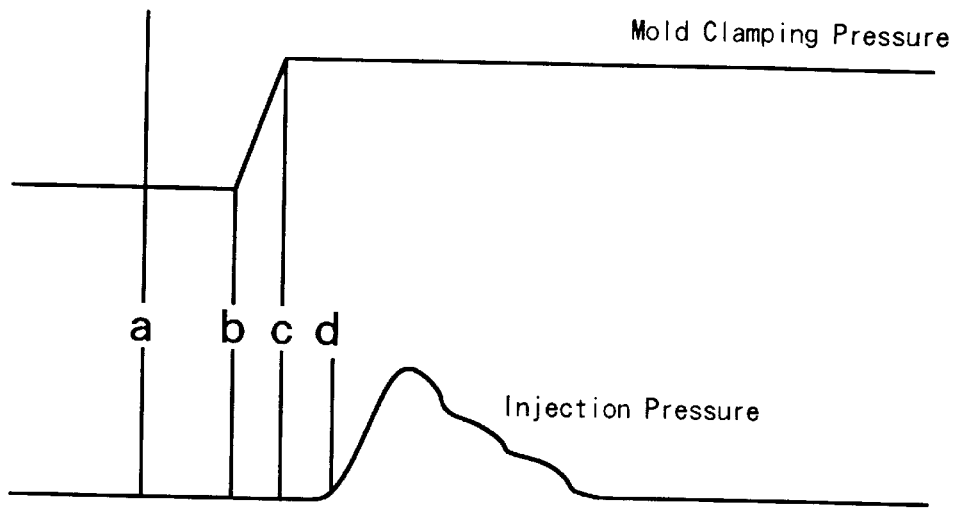
FIG. 2 is a view for explanation of a method for molding the conventional disc base.
Figure 4:
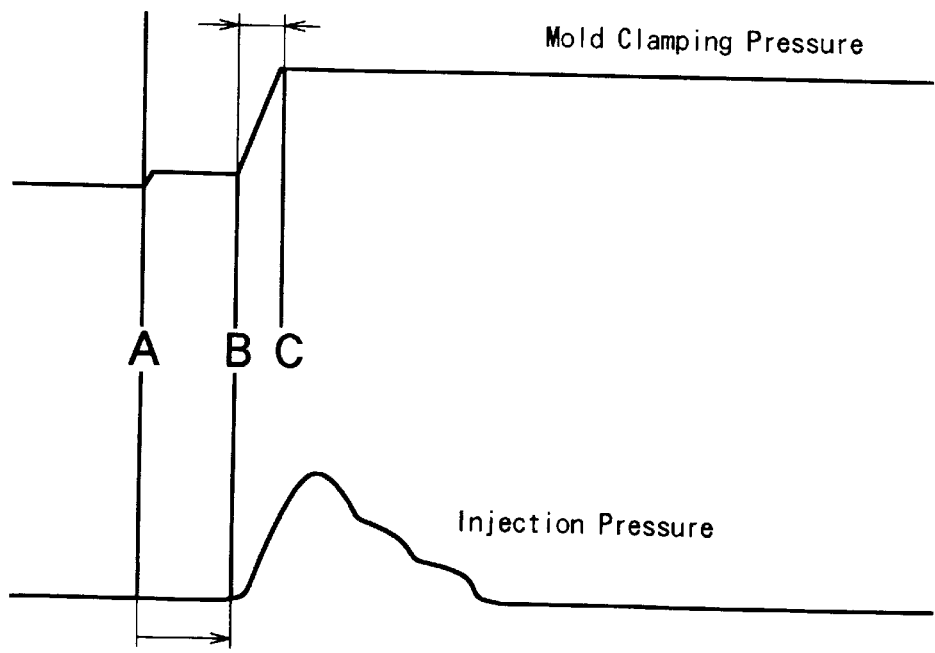
FIG. 4 is a view for explanation of a method for molding the disc base of the present invention.

Using the thus-constituted disc molding apparatus, the molding method of the present invention will be explained referring to FIGS. 3 and 4. On the axis of ordinate, the mold clamping pressure and the injection pressure are shown, and on the abscissa, the time is shown.

First, the mold closing operation is carried out at high speed by supplying the hydraulic pressure from the hydraulic source to the port 27 of the rear end of the booster ram 25. When the signal which detected the finishing (Timing A in FIG. 4) of the mold closing by the mold closing detecting means is input, the change of the servo valve 31 is begun to prepare for supplying the hydraulic pressure to the port 19a of the mold clamping cylinder 19 and then the injection start delay timer and the mold clamping start delay timer, which are stored in the memory 40 begin to count the time.

During the time period until the substantial start of the mold clamping after finishing the molds closing, that is, until the servo valve 31 is changed actually (between the timing A and the timing B in FIG. 4), by the drive of the booster ram 25, for instance the pressure increase of 2–3 tons(in the case of rated 25 tons of mold clamping force) is realized. At this moment, the check valve 32 is closed. And, when the servo valve 31 is changed, the mold clamping is begun to start substantially by supplying the hydraulic pressure to the port 19a of the mold clamping cylinder. The control of the servo valve 31 is carried out by closing loop operation of the microprocessor unit MPU based on the determined value of the mold clamping and the signal transmitted from pressure detector 33 through the input 42, and it is feed-back controlled in such a manner as a time period until when a given mold clamping force is maintained starting from the start (timing B in FIG. 4) of the mold clamping to the finishing (timing C in FIG. 4) of the pressure increase of the mold clamping can be controlled.

And, further, during time period from the detecting that the mold closing finished until the start of the mold clamping (from timing A to timing B in FIG. 4), the injection of the molten resin is retarded by the injection start time delay timer in such a manner as the injection of the molten resin in the cavity 3 is started ( timing B in FIG. 4) simultaneously with the start of the mold clamping.

The start of pressure increase of the mold clamping can be settled freely according to the mold clamping start delay timer, relating to the start of the pressure increase of the mold the injection start timing is settled. And, after closing the molds, in the case that only at the time of enabling the servo valve 31 to be changed the injection starts, that is, in the case of carrying out only the present invention in which the start of clamiping molds and injecting the molten resin is carried out simultaneously, the molds clamping start delay timer is not necessary to be stored in the memory 40.

After finishing the pressure increase of the molds clamping (following timing C in FIG. 4), until the cool solidification of the molten resin, the molds clamping force is kept to a specific molds clamping force of such as 20–25 tons. This molds clamping pressure is different according to the depth of the pit which is formed in a stamper, in the case of the stamper having a deep pit a large molds clamping pressure is settled.

Figure 5:
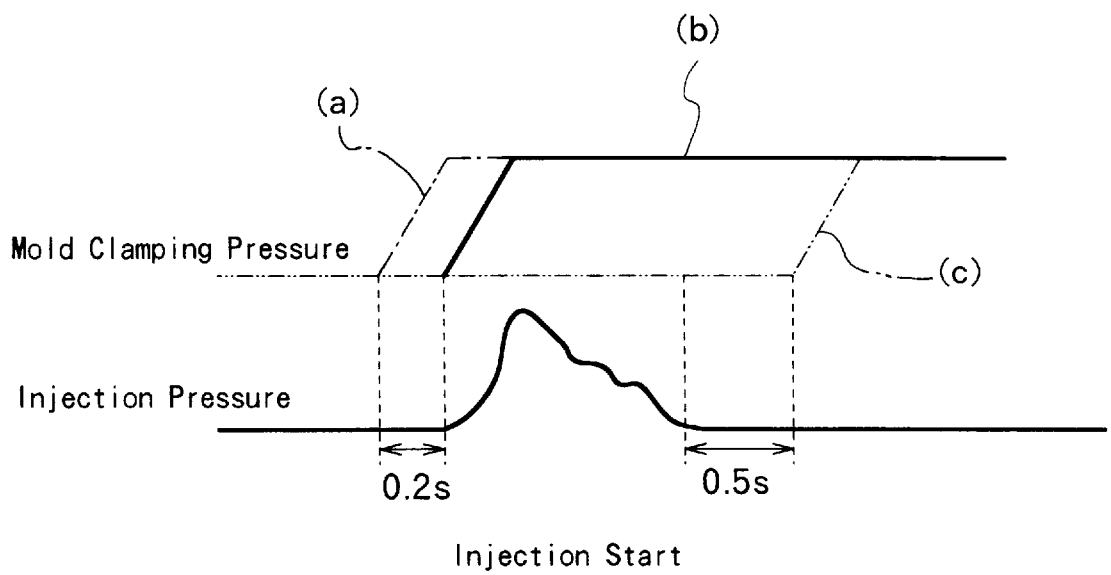
FIG. 5 is a view for explanation of the relationship, after finishing the mold closing, between the timing of the mold closing and the injection start, and its Jitter value and the distortion amount measured.

Next, in accordance with FIG. 5, here is an explanation about the relationship between the timing in which the molds clamping start and the injection start are arranged after the finishing the molds closing in the actual molding a disc (0.6 mm in thickness ) having a diameter of 12 cm for the use of bonded disc, and the Jitter value and the distortion amount measured. Here, the Jitter value means the value of the differences in the longitudinal direction (circumferential direction) of the pit transferred from the stamper, which is used for checking the finish of the disc, and larger this value shows larger noise troubles, by which noise will appear when reproducing, and smaller this value shows smaller noise trouble. IN shows the Jitter value of the disc 23 mm in radius, and OUT shows the Jitter value of the disc 58 mm in radius.

In FIG. 5, the timing (a) means the case where the pressure increase begins 0.2 sec before the start of the injection as well as the conventional manner, the timing (b) means the case of the invention where the pressure increase for mold clamping starts simultaneously with the injection start, and the timing (c) means the case where the pressure increase for the mold clamping starts 0.5 sec after the finishing of the injection. As obvious from the drawing, the jitter value and distortion amount, although the case (c) where the mold clamping starts after finishing the injection is better than the conventional case (a) where the molding clamping is carried out before the injection, the case (b) according to the present invention where the mold clamping begins simultaneously with the injection is least in the Jitter value and distortion amount compared with the cases (a) and (c), and obtained a very good quality of disc base. The simultaneous start in the injection and the pressure increase for mold clamping in the present invention contains the allowance in the usual range.

As explained above, according to the molding method of a disc base and the apparatus therefor of the present invention, since, after detecting the mold closing, the injection of the molten resin in the cavity starts almost simultaneously with the start of the mold clamping, even though the thin disc such as 0.6 mm in thickness for the use of bonded disc is molded, the signal is transferred clearly, and the mechanical property is increased and further the molding cycle can be shortened.

According to the molding method of a disc base and the apparatus therefor of the present invention, the pressure for injecting and filling can be controlled and can mold the disc base homogeneously in the partial quality by levelling the pressure distribution of the molten resin.

Further, according to the molding method of a disc base and the apparatus therefor of the present invention, by avoiding the necessity of keeping the temperature of the resin and the mold high, the distortion of the disc base can be prevented and the cooling cycle can be shortened.

Still further, according to the molding method of a disc base and the apparatus therefor of the present invention, without changing the mold clamping force stepwise, by only keeping the force constant, a disc base which is improved in the mechanical property can be obtained.

What is claimed is:

1. A disc base molding method comprising the steps of:
   a) closing a mold;
   b) detecting that the mold closing is complete and generating a mold closure signal;
   c) activating a pressure increase timer upon the generation of the mold closure signal;
   d) applying mold clamping pressure after a given time period determined by the pressure increase timer; and
   e) injecting molten resin into the mold for a predetermined period of time, the injection being approximately concurrent with application of the mold clamping pressure.

2. A disc base molding method according to claim 1, further comprising the step of increasing the mold clamping pressure for a predetermined period of time while the molten resin of step e) is injected into the mold.

3. A disc base molding method according to claim 2, wherein the predetermined period of time for increasing the mold clamping pressure is controllable.

4. A disc base molding method according to claim 3, further comprising the step of maintaining the mold clamping pressure upon completion of the injection of the molten resin until the molten resin has solidified.

5. A disc molding apparatus for injecting molten resin into a cavity formed by a plurality of mold sections comprising:
   a mold;
   a mold clamping apparatus for opening and closing said mold;
   a mold closing detector for detecting mold closure, said detector generating a mold closure signal;
   a pressure increase timer, said pressure increase timer starting a time period upon receiving the mold closure signal;
   an injection apparatus for injection of said molten resin into said mold cavity; and
   a control apparatus for controlling the injection apparatus and the mold clamping apparatus, such that a mold clamping pressure is applied after lapse of the time period and approximately concurrent with the injection of said molten resin into said mold cavity.

6. A disc molding apparatus according to claim 5, wherein the pressure increase timer generates a pressure increase signal at a predetermined time following receipt of the mold closure signal, and wherein the control apparatus causes a clamping pressure for holding the mold closed to be increased when the pressure increase timer generates said pressure increase signal.

7. A disc molding apparatus according to claim 6, further comprising:
   an injection start delay timer, said injection start delay timer having the ability to receive the mold closure signal.

8. A disc molding apparatus according to claim 7, wherein said injection start delay timer generates an injection signal at a predetermined time following receipt of the mold closure signal, and wherein the control apparatus initiates injection of the molten resin when the injection start delay timer generates said injection signal.

9. A disc molding apparatus according to claim 8, wherein said injection signal is generated approximately concurrent with generation of the pressure increase signal.

10. A disc molding apparatus according to claim 5, wherein said control apparatus further comprises an injection start delay timer and wherein the pressure increase timer is a pressure increase start delay timer.

11. A control system for controlling a mold clamping and resin injecting process, comprising:
    means for detecting mold closing and generating a mold closure signal;
    means for controlling application of a mold clamping pressure, said pressure application control means including a pressure increase timer that starts a time period upon receiving the mold closure signal; and
    means for controlling resin injection;
    wherein the pressure application control means causes a mold clamping pressure to be applied after lapse of the time period upon detection of the mold closing, and wherein the means for controlling resin injection causes the resin to be injected into the mold approximately concurrent with the initial application of the mold clamping pressure.

12. The control system of claim 11, wherein the applied mold clamping pressure increases for a predetermined period of time to a predetermined pressure value.

13. The control system of claim 11, wherein the mold clamping pressure is maintained at a predetermined value until the injected resin solidifies.

* * * * *